US008419047B2

(12) United States Patent
Chen

(10) Patent No.: US 8,419,047 B2
(45) Date of Patent: Apr. 16, 2013

(54) FOLDING DEVICE FOR WHEELCHAIR

(75) Inventor: Cheng-Nan Chen, Chiayi Hsien (TW)

(73) Assignee: Karma Medical Products Co., Ltd., Chiayi Hsien (TW)

( * ) Notice: Subject to any disclaimer, the term of this patent is extended or adjusted under 35 U.S.C. 154(b) by 366 days.

(21) Appl. No.: 12/840,536

(22) Filed: Jul. 21, 2010

(65) Prior Publication Data

US 2012/0018982 A1 Jan. 26, 2012

(51) Int. Cl.
*B62B 7/06* (2006.01)

(52) U.S. Cl.
USPC ............ 280/647; 280/650; 280/639; 280/642

(58) Field of Classification Search .................. 280/638, 280/639, 642, 647, 650, 47.34, 47.38
See application file for complete search history.

(56) References Cited

U.S. PATENT DOCUMENTS

| | | | | | |
|---|---|---|---|---|---|
| 2,782,870 | A | * | 2/1957 | Sill | 188/2 F |
| 2,946,602 | A | * | 7/1960 | Lee | 280/211 |
| 3,337,261 | A | * | 8/1967 | Nihlean et al. | 297/44 |
| 3,833,256 | A | * | 9/1974 | Dehner | 297/44 |
| 4,026,568 | A | * | 5/1977 | Hallam | 280/42 |
| 4,693,490 | A | * | 9/1987 | Loodberg et al. | 280/650 |
| 4,809,818 | A | * | 3/1989 | Leggett et al. | 188/2 F |
| 4,813,693 | A | * | 3/1989 | Lockard et al. | 280/42 |
| 4,989,890 | A | * | 2/1991 | Lockard et al. | 280/42 |
| 5,240,276 | A | * | 8/1993 | Coombs | 280/647 |
| 5,558,358 | A | * | 9/1996 | Johnson | 280/648 |
| 6,135,475 | A | * | 10/2000 | Brown et al. | 280/250.1 |
| 6,352,275 | B1 | * | 3/2002 | Lindenkamp | 280/250.1 |
| 6,499,762 | B1 | * | 12/2002 | Rogers et al. | 280/650 |
| 6,705,629 | B2 | * | 3/2004 | Post et al. | 280/250.1 |
| 6,839,918 | B1 | * | 1/2005 | Jensen | 4/480 |
| 7,108,004 | B2 | * | 9/2006 | Cowie et al. | 135/74 |
| 7,128,332 | B2 | * | 10/2006 | Hermes et al. | 280/647 |
| 7,364,228 | B2 | * | 4/2008 | Entz | 297/44 |
| 7,651,103 | B1 | * | 1/2010 | Peridon | 280/5.22 |
| 7,686,324 | B2 | * | 3/2010 | Nishi | 280/650 |
| 8,083,252 | B2 | * | 12/2011 | Wagner et al. | 280/650 |
| 2005/0172405 | A1 | * | 8/2005 | Menkedick et al. | 5/618 |
| 2005/0211285 | A1 | * | 9/2005 | Cowie et al. | 135/74 |
| 2007/0102901 | A1 | * | 5/2007 | Murayama | 280/642 |
| 2007/0145723 | A1 | * | 6/2007 | Kamara | 280/647 |
| 2008/0265548 | A1 | * | 10/2008 | Hammer et al. | 280/650 |
| 2010/0194077 | A1 | * | 8/2010 | Wagner et al. | 280/650 |
| 2011/0175329 | A1 | * | 7/2011 | Gingras et al. | 280/647 |

* cited by examiner

*Primary Examiner* — Hau Phan
*Assistant Examiner* — Jacob Meyer
(74) *Attorney, Agent, or Firm* — Rosenberg, Klein & Lee

(57) ABSTRACT

A folding device of a wheelchair includes a first folding unit and a second folding unit, wherein the first folding unit includes a first part, a second part and a connection rod connected between the first part and the second part. The first part has a first link and a second link respectively and pivotably connected thereto, and the second part has a third link and a fourth link respectively and pivotably connected thereto. The second folding unit has two boards and the two boards have two connection units. Each board has a recess and two lugs. Each recess has a first plate and a second plate connected thereto. A handle has two ends which are respectively and pivotably connected to the first and second plates.

3 Claims, 9 Drawing Sheets

FOLDING DEVICE FOR WHEELCHAIR

FIELD OF THE INVENTION

The present invention relates to a folding device for wheelchairs, and more particularly, to a folding device for folding large size wheelchairs.

BACKGROUND OF THE INVENTION

A conventional wheelchair is bulky and not convenient for folding and storage, especially, the folded wheelchair is not convenient to be put into the trunk of vehicles.

A conventional wheelchair generally includes a frame with wheels, a seat and a backrest. The frame includes two separated side parts and a folding device is pivotably connected between the two side parts so as to expand or fold the two side parts. Each side part has a top bar and a bottom bar which is parallel to the top bar. The folding device includes two support rods which are respectively and pivotably connected to the first end and the second end of the bottom bar, wherein the second end is located remote from the first end and is connected to the seat. The two support bars are pivotable at a pivot at a mediate portion thereof. At least two connection members are respectively connected to the top bars on the two side parts and each connection member has a through hole which is axially defined in the top bar. At least two links are provided and each link has a first pivotal end and a second pivotal end, wherein the two respective first pivotal ends are pivotably connected to the support rods and the two respective second pivotal ends are located in alignment with the through holes, and two shafts extend through the second ends and the through holes.

Another conventional wheelchair generally includes two separated side parts and a folding device is pivotably connected between the two side parts. Each of the side parts has a bottom bar and a top bar which is parallel to the bottom bar. Two lugs extend from the bottom bar and extend toward the other side part. At least one support portion extends from the top bar and toward the other side part. The folding device includes two pivotal rods which are parallel to the bottom bars of the two side parts and two ends of each of the two pivotal rods are located corresponding to the lugs corresponding thereto. At least two rotatable rods are provided and each has one end fixed to the pivotal rod corresponding thereto. A shaft is pivotably between two respective mediate portions of the two rotatable rods and the axis of the shaft is parallel to the pivotal shaft of the two pivotal rods so that the two rotatable rods are pivotable about the shaft. Two support rods are respectively and perpendicularly connected to the other two respective ends of the rotatable rods. The two support rods are parallel to the two pivotal rods. Therefore, the two support rods are moved between an expansion position and a folding position when the two rotatable rods are pivoted. When the wheelchair is expanded, the two support rods are connected to the side parts and supported by the support portions.

However, the support is insufficient when the wheelchair is expanded and so that when the user use the wheelchair, the wheelchair might collapse suddenly and the safety problem is the main concern for the conventional folding device.

The present invention intends to provide a folding device for wheelchair and the folding device of the present invention improves the shortcoming of the conventional folding device.

SUMMARY OF THE INVENTION

The present invention relates to a folding device of a wheelchair and the folding device comprises a first folding unit and a second folding unit, wherein the first folding unit has a first part and a second part. A connection rod is connected between the first part and the second part. The first part has a first link and a second link respectively and pivotably connected thereto. The second part has a third link and a fourth link respectively and pivotably connected thereto. The connection rod has a sleeve which is connected to a support unit. Two support rods are pivotably connected to the support unit and each support rod has a support member pivotably connected thereto. The two respective support members are respectively connected to the first link and the second link. Each of the first link, the second link, the third link, and the fourth link has a connection tube connected thereto. The second folding unit has two boards and the two boards have two connection units. Each board has a recess and two lugs. Each recess has a first plate and a second plate connected thereto. A handle has two ends which are respectively and pivotably connected to the first and second plates.

The connection units can be two hinges or two flexible plates.

The folding device is cooperated with a wheelchair which includes two side parts. The lugs on the boards and the connection tubes on the first link, the second link, the third link, and the fourth link are connected to the side parts.

The primary object of the present invention is to provide a folding device wherein the first folding unit expands beyond its dead point so that the expanded status is firm and secured. Unless the first folding unit is released by an external force, the wheelchair does not collapse during use.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
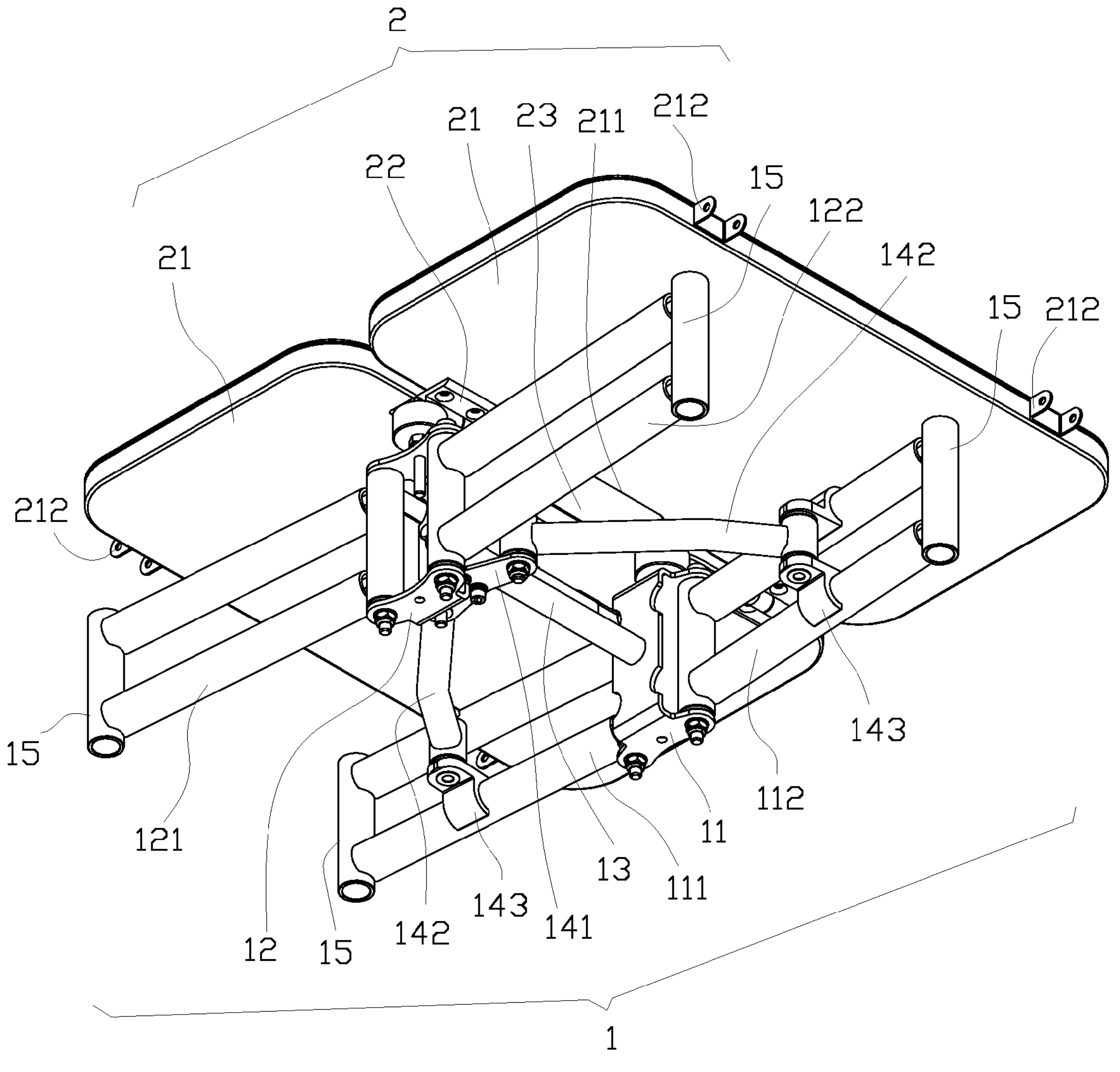
FIG. 1 is a bottom perspective view to show the first and second folding units of the present invention.
Figure 2:
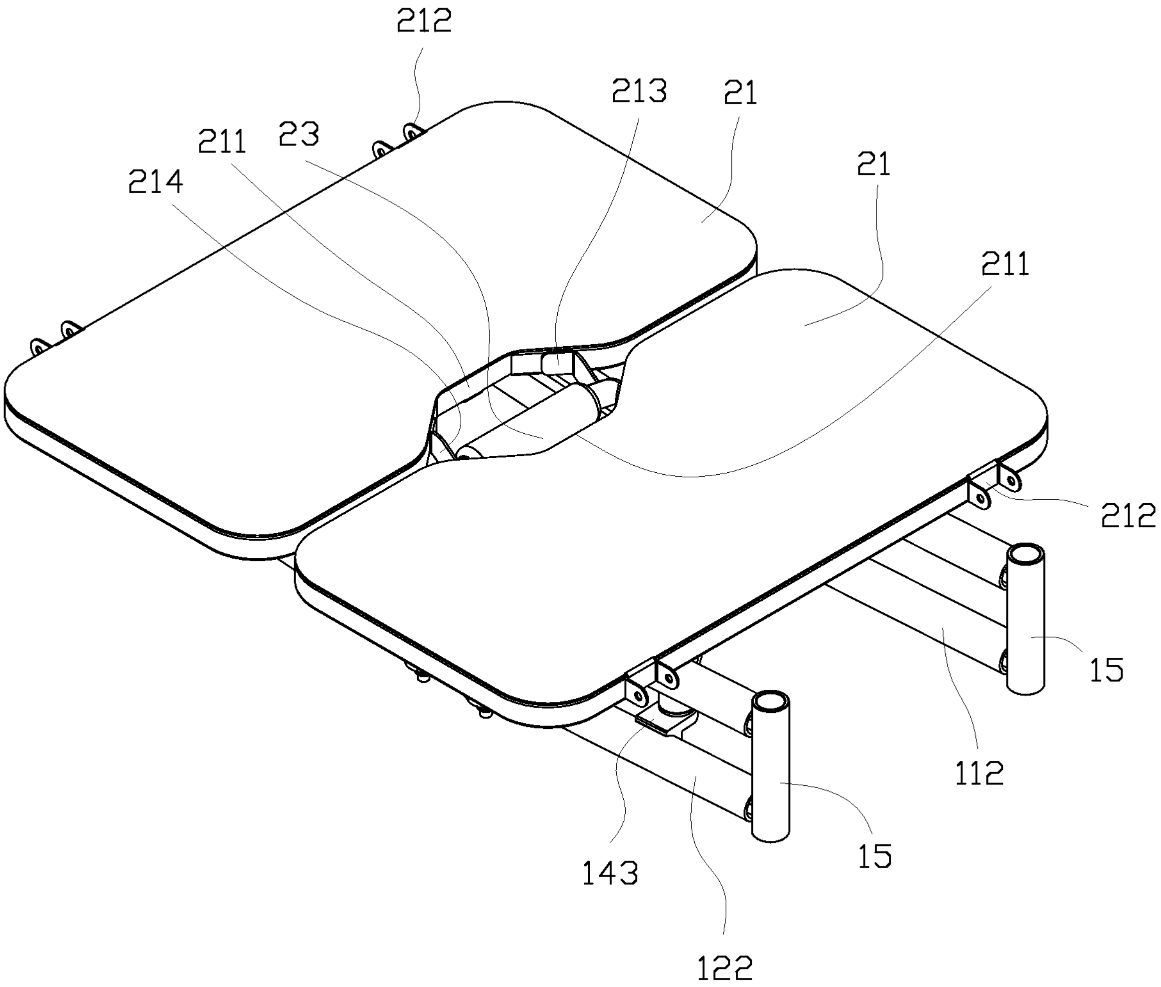
FIG. 2 is a top perspective view to show the first and second folding unit of the present invention.
Figure 4:
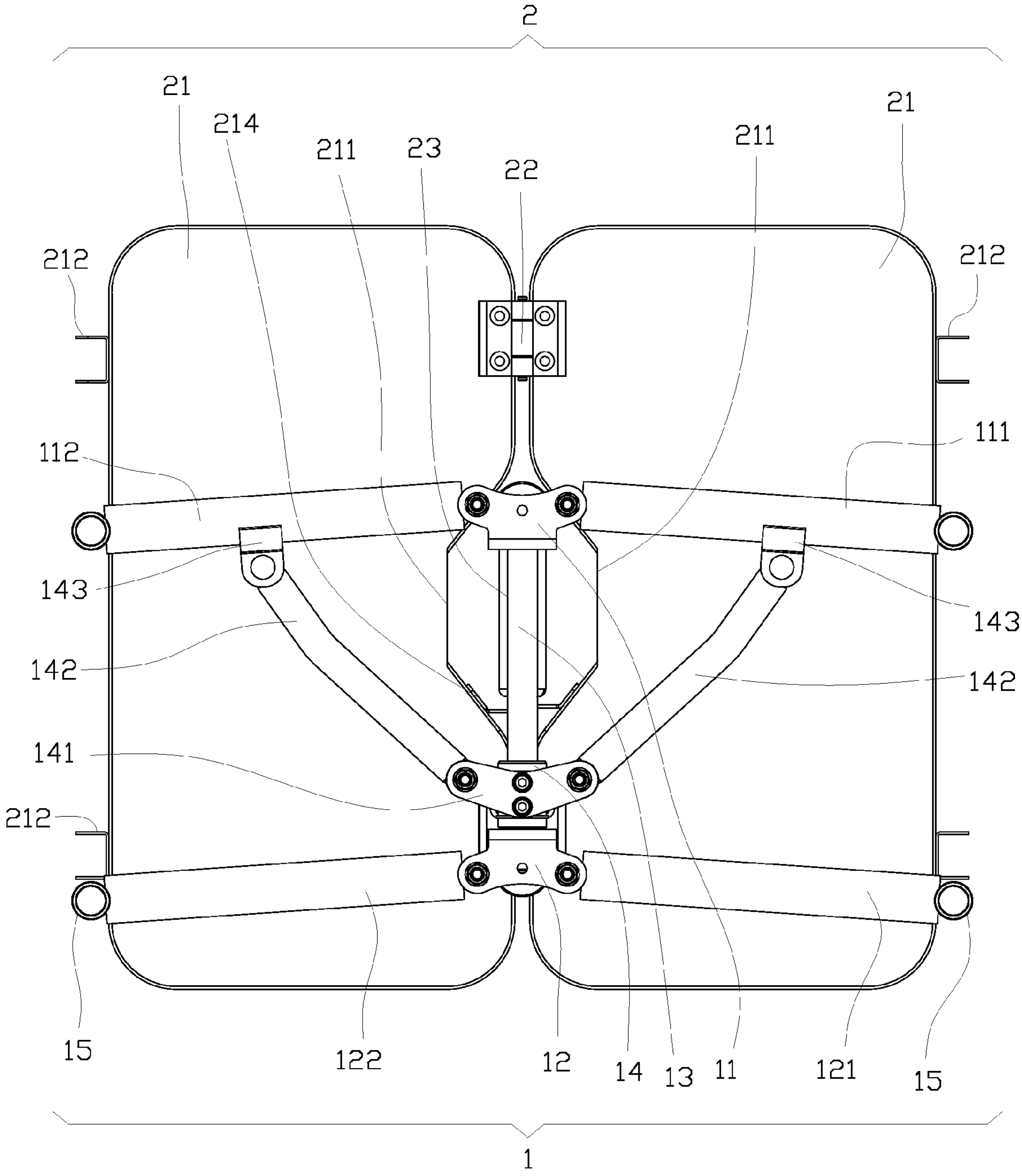
FIG. 4 is a bottom view to show the first and second folding units of the present invention.

Referring to FIGS. 1, 2 and 4, the folding device of a wheelchair of the present invention comprises a first folding unit 1 and a second folding unit 2, wherein the first folding unit 1 has a first part 11 and a second part 12, and a connection rod 13 is connected between the first part 11 and the second part 12. The first part 11 has a first link 111 and a second link 112 respectively and pivotably connected thereto. The second part 12 has a third link 121 and a fourth link 122 respectively and pivotably connected thereto. The connection rod 13 has a sleeve 14 which is connected to a support unit 141. Two support rods 142 are pivotably connected to the support unit 141 and each support rod 142 has a support member 143 pivotably connected thereto. The two respective support members 143 are respectively connected to the first link 111 and the second link 112. Each of the first link 111, the second link 112, the third link 121, and the fourth link 122 has a connection tube 15 connected thereto.

The second folding unit 2 has two boards 21 and the two boards 21 have two connection units 22 which connect the two boards 21. The connection units 22 are two hinges. Each board 21 has a recess 211 and two lugs 212. Each recess 21 has a first plate 213 and a second plate 214 connected thereto. A handle 23 has two ends which are respectively and pivotably connected to the first and second plates 213, 214.

Figure 3:
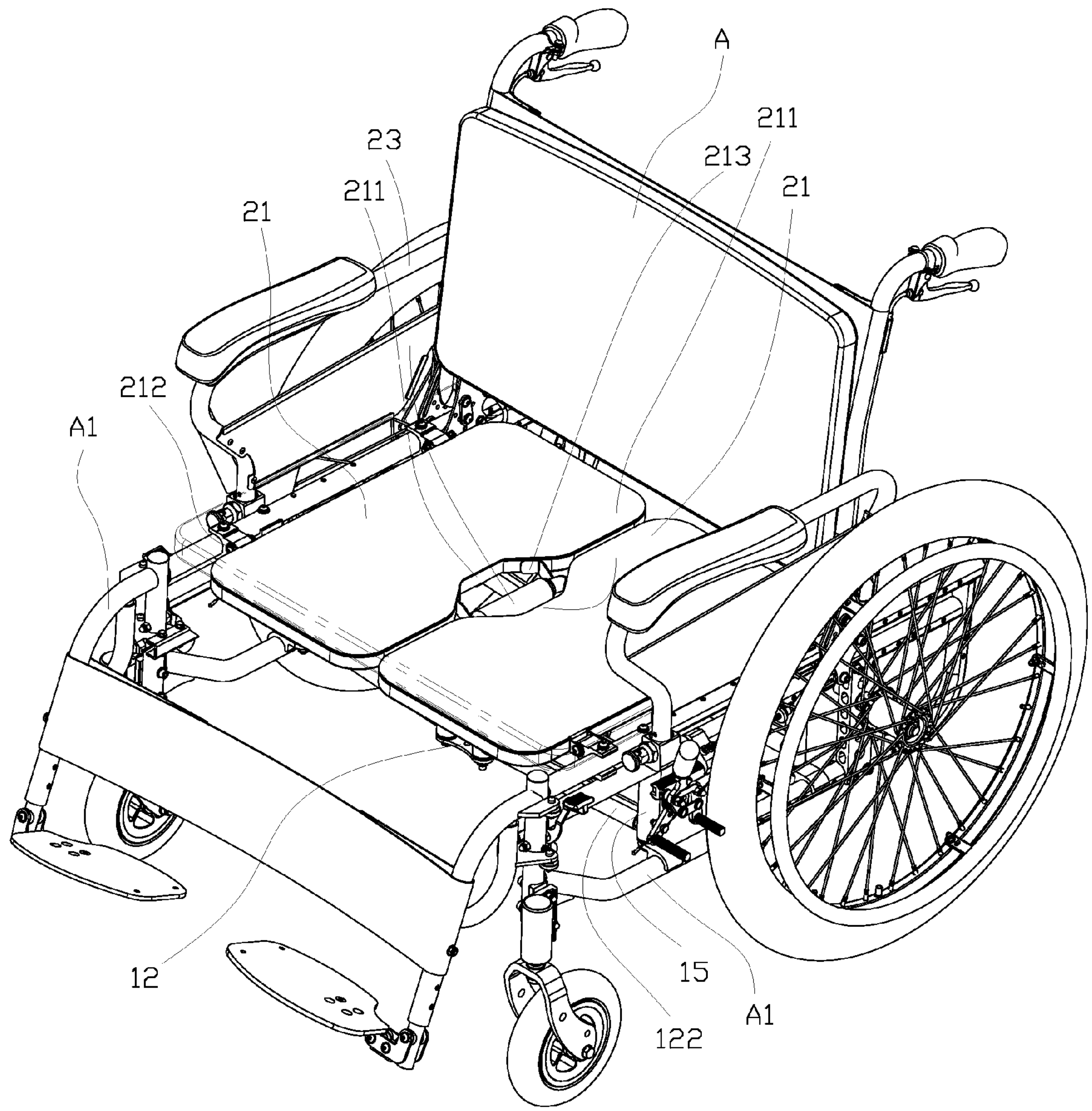
FIG. 3 is a bottom perspective view to show that the first and second folding units of the present invention are cooperated with a wheelchair.

As shown in FIG. 3, the folding device is cooperated with a wheelchair "A" which includes two side parts "A1". The lugs 212 on the boards 21 and the connection tubes 15 on the first link 111, the second link 112, the third link 121 and the fourth link 122 are connected to the side parts "A1".

As shown in FIG. 4, the first link 111, the second link 112, the third link 121, and the fourth link 122 are expanded and beyond their dead points so that the first folding unit 1 is firm and secured. The support unit 141, the support rods 142 and support members 143 further provide a secondary support so that the first folding unit 1 does not collapse by indirect force from outside of the wheelchair "A".

When folding the side parts "A1" of the wheelchair "A", a force is directly applied to the first part 11 of the first folding unit 1 to move the first part 11 which drives the first link 111, the second link 112, the connection rod 13, and the third and fourth links 121, 122 of the second part 12 so as to fold the folding unit 1.

Figure 5:
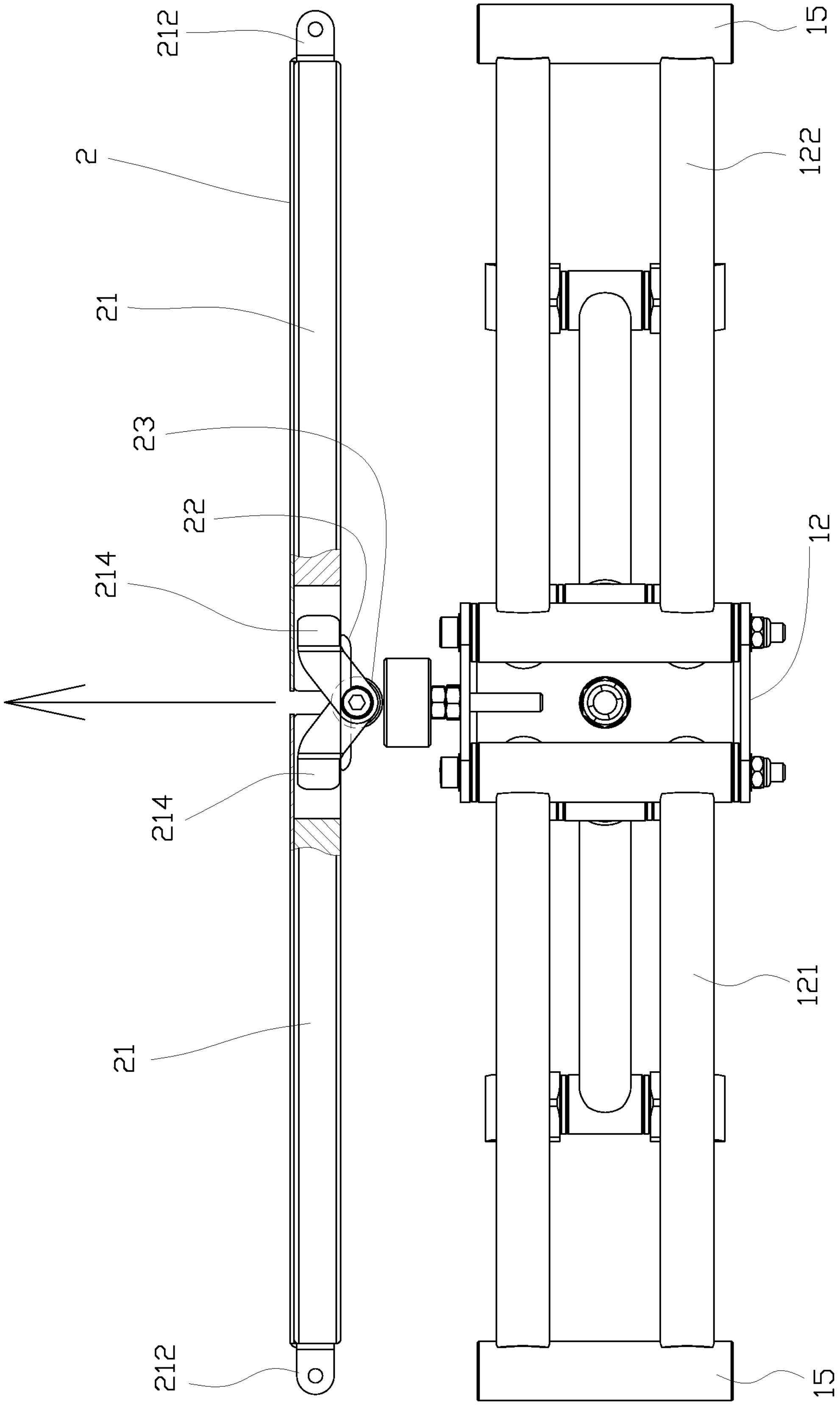
FIG. 5 is a side view to show that the first and second folding units of the present invention are to be folded.
Figure 6:
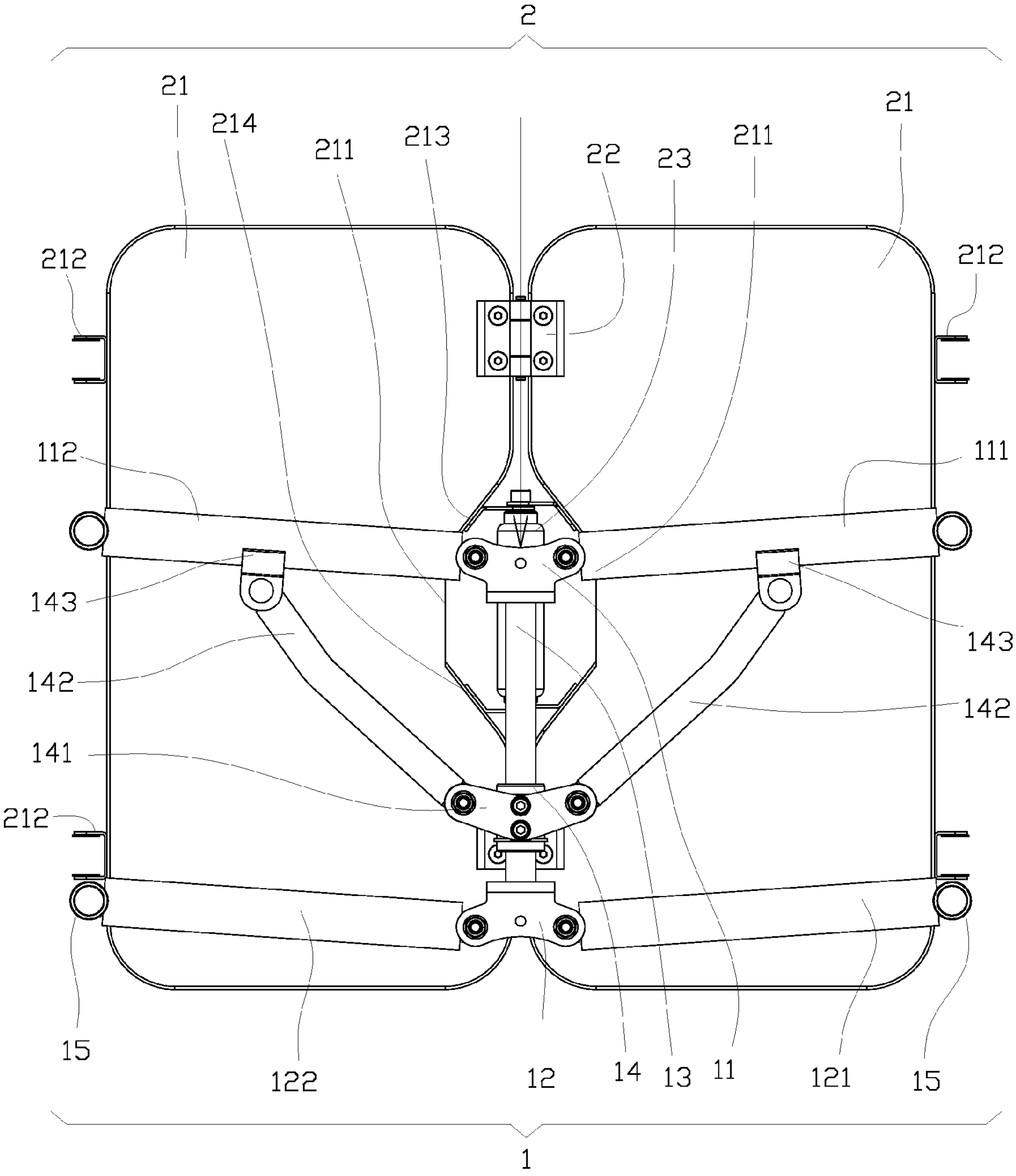
FIG. 6 is a bottom view to show that the first and second folding units of the present invention are to be folded.
Figure 7:
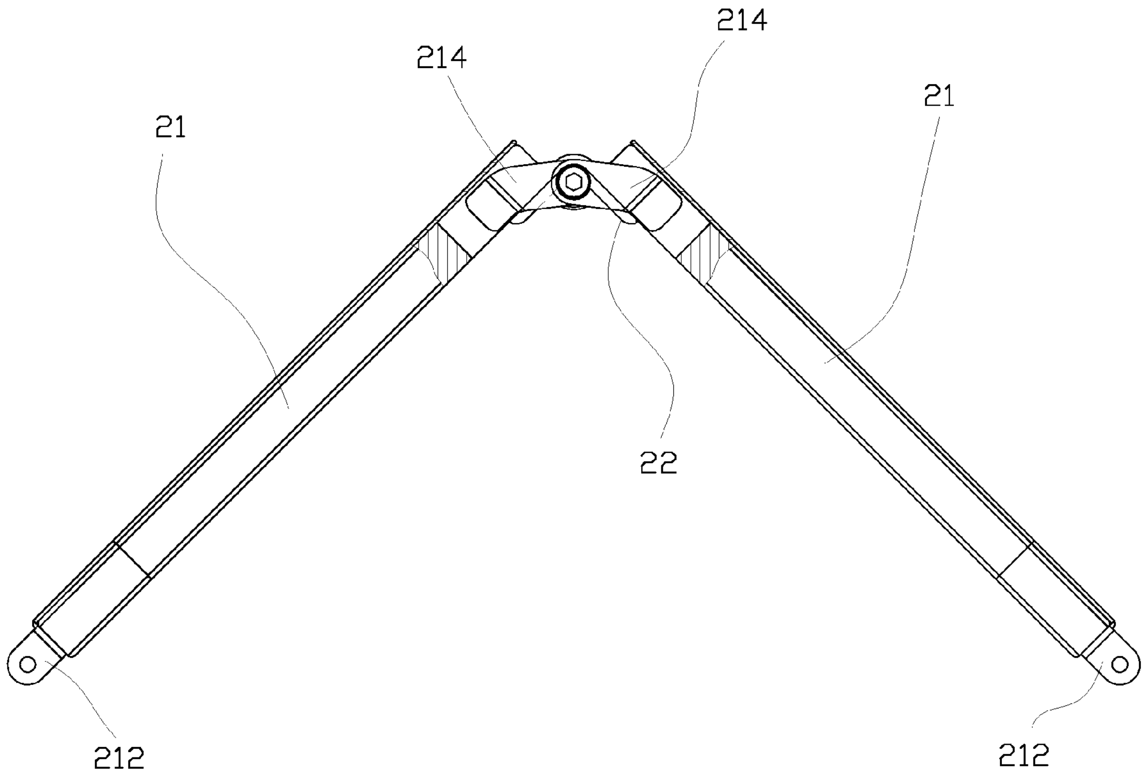
FIG. 7 is a side view to show that the second folding unit is folded.

As shown in FIGS. 3 and 5, the user holds the handle 23 of the second folding unit 2 and lifts the handle 23 as shown in FIG. 7, the two boards 21 are pivoted toward each other by the two connection units 22. The two lugs 212 are moved inward along with the boards 21 and pull the two side parts "A1" toward each other.

Figure 8:
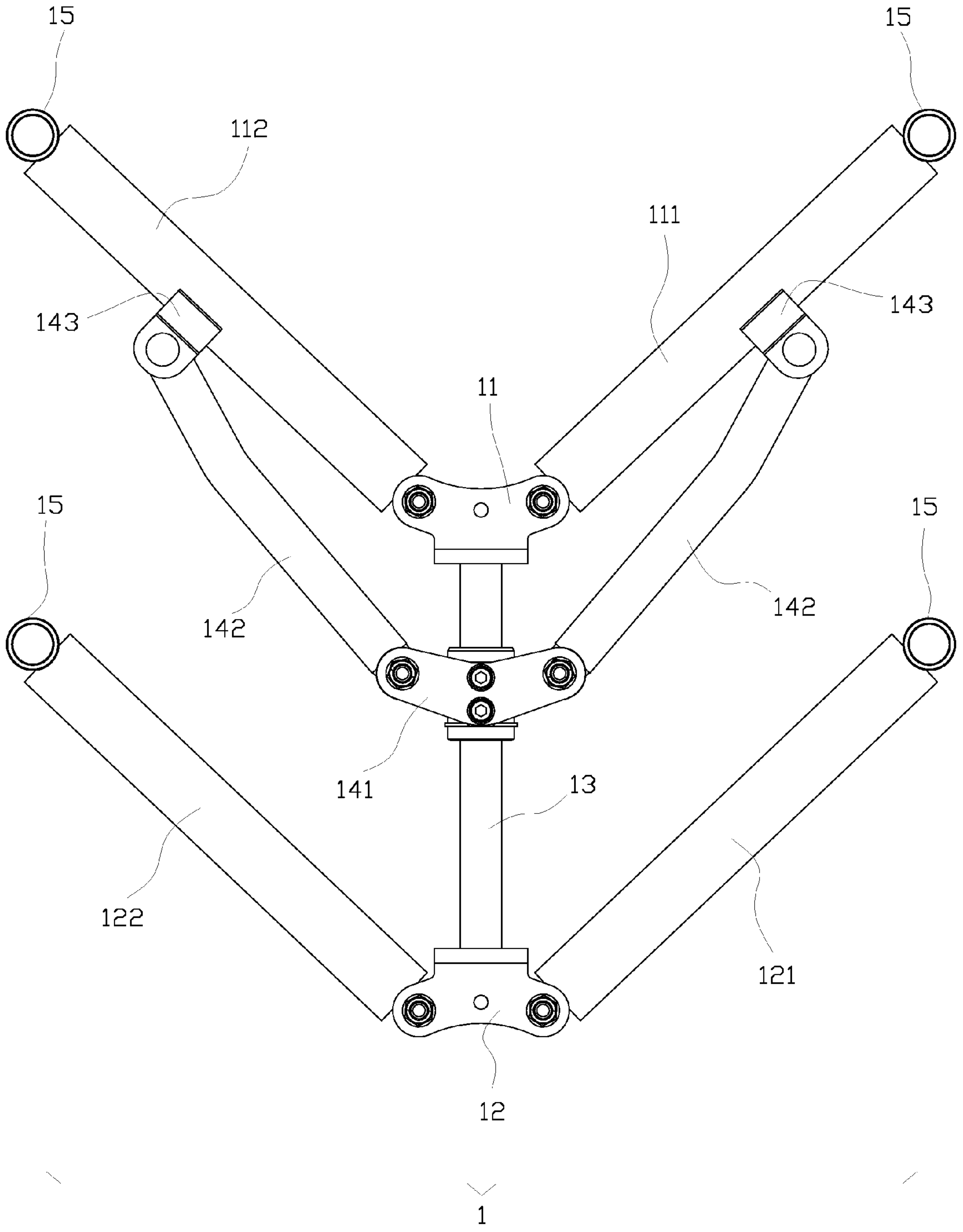
FIG. 8 is a bottom view to show that the first folding unit is folded.

Referring to FIGS. 4 and 8, the first folding unit 1 is released from its expanded status and because the connection tubes 15 of the first, second, third and fourth links 111, 112, 121, 122 are connected to the side parts "A1", so that the when the side parts "A1" are pulled toward each other, the first part 11, the connection rod 13 and the second folding unit 2 are folded. The higher that the handle 23 is pulled upward, the side parts "A1" of the wheelchair "A" are moved toward the center of the wheelchair "A". The movement of the side parts "A1" further folds the first folding unit 1 so that the user can easily fold the wheelchair "A".

Figure 9:
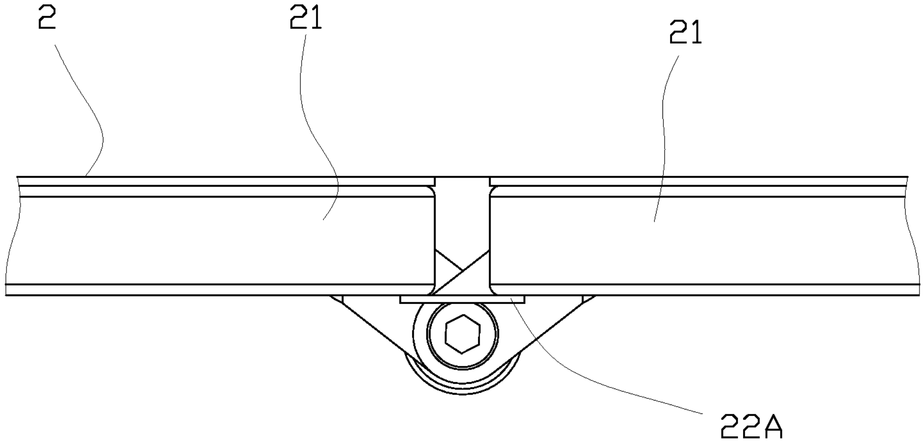
FIG. 9 is a side view to show a second embodiment of the second folding unit of the present invention.
Figure 10:
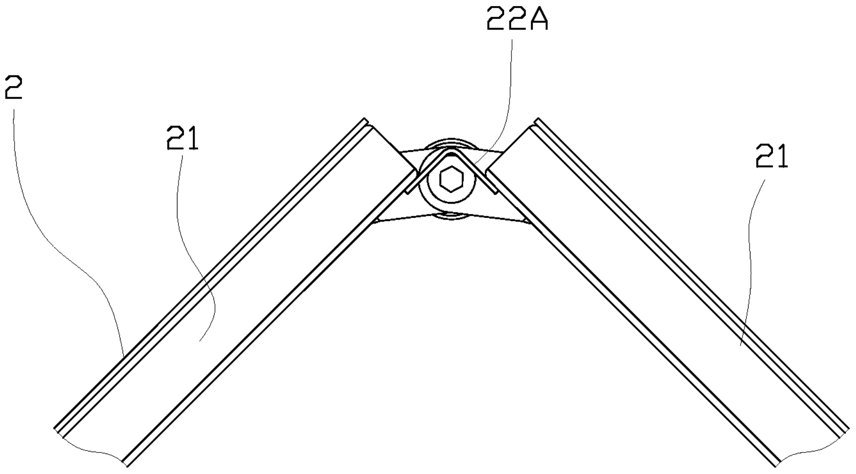
FIG. 10 is a side view to show the second embodiment of the second folding unit of the present invention.

As shown in FIG. 9, the connection units 22A on the boards 21 of the second folding unit 2 can be flexible plates. As shown in FIG. 10, when the two boards 21 are folded and change their relative angles, the connection units 22A are bent as shown in FIG. 10.

While we have shown and described the embodiment in accordance with the present invention, it should be clear to those skilled in the art that further embodiments may be made without departing from the scope of the present invention.

What is claimed is:

1. A folding device of a wheelchair, comprising:

a first folding unit having a first part and a second part, a connection rod connected between the first part and the second part, the first part having a first link and a second link respectively and pivotably connected thereto, the second part having a third link and a fourth link respectively and pivotably connected thereto, the connection rod having a sleeve which is connected to a support unit, two support rods pivotably connected to the support unit and each of the two support rods having a support member pivotably connected thereto, the support members of the two support rods being respectively connected to the first link and the second link, each of the first link, the second link, the third link, and the fourth link having a connection tube connected thereto, and a second folding unit having two boards, the two boards having two connection units, the boards each having a recess and two lugs, the recess having a first plate and a second plate connected thereto, a handle having two ends which are respectively and pivotably connected to the first and second plates.

2. The folding device as claimed in claim 1, wherein the connection units are two hinges.

3. The folding device as claimed in claim 1, wherein the connection units are two flexible plates.

* * * * *